(12) United States Patent
Nomura

(10) Patent No.: US 12,379,806 B2
(45) Date of Patent: Aug. 5, 2025

(54) SENSOR CONTROLLER, ELECTRONIC DEVICE, AND POSITION DETECTION METHOD

(71) Applicant: Wacom Co., Ltd., Saitama (JP)

(72) Inventor: Yoshio Nomura, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 18/677,643

(22) Filed: May 29, 2024

(65) Prior Publication Data

US 2024/0402847 A1 Dec. 5, 2024

(30) Foreign Application Priority Data

May 30, 2023 (JP) ................................. 2023-089193

(51) Int. Cl.
*G06F 3/041* (2006.01)
*G06F 3/044* (2006.01)

(52) U.S. Cl.
CPC ...... *G06F 3/04166* (2019.05); *G06F 3/04186* (2019.05); *G06F 3/0441* (2019.05); *G06F 3/0442* (2019.05)

(58) Field of Classification Search
CPC .............. G06F 3/0442; G06F 3/04166; G06F 3/04186; G06F 3/0441; G06F 3/041; G06F 3/044
See application file for complete search history.

(56) References Cited

U.S. PATENT DOCUMENTS

| 8,614,664 B2 * | 12/2013 | Yasutake | G06F 3/04883 345/173 |
| 9,239,637 B2 * | 1/2016 | Westhues | G06F 3/0442 |
| 9,367,185 B2 * | 6/2016 | Sasselli | G06F 3/0446 |
| 11,714,500 B2 * | 8/2023 | Miyamoto | G06F 3/0383 345/173 |
| 2012/0013555 A1 * | 1/2012 | Maeda | G06F 3/0446 345/173 |
| 2012/0050231 A1 * | 3/2012 | Westhues | G06F 3/0441 345/179 |
| 2012/0182238 A1 * | 7/2012 | Lee | G06F 3/04166 345/173 |

(Continued)

FOREIGN PATENT DOCUMENTS

WO 2018/225204 A1 12/2018

*Primary Examiner* — Olga V Merkoulova
(74) *Attorney, Agent, or Firm* — Seed IP Law Group LLP

(57) ABSTRACT

Provided is a sensor controller connected to a capacitive touch sensor. The sensor controller includes a scan execution circuit which, in operation, repeatedly performs a first scan and a second scan on the capacitive touch sensor in a time-division manner, a first calculation circuit which, in operation, calculates a first pen position from a first detection signal acquired through the first scan performed by the scan execution circuit, a second calculation circuit which, in operation, calculates a touch position and a second pen position from a second detection signal acquired through the second scan performed by the scan execution circuit, and an output processing circuit which, in operation, outputs a pen position that differs depending on a result of a comparison process in which the first pen position calculated by the first calculation circuit is compared with the second pen position calculated by the second calculation circuit.

9 Claims, 12 Drawing Sheets

(56) References Cited

U.S. PATENT DOCUMENTS

| | | | |
|---|---|---|---|
| 2014/0168116 A1* | 6/2014 | Sasselli | G06F 3/0446 345/173 |
| 2014/0168142 A1* | 6/2014 | Sasselli | G06F 3/044 345/174 |
| 2015/0091820 A1* | 4/2015 | Rosenberg | G06F 3/041661 345/173 |
| 2016/0092010 A1* | 3/2016 | Agarwal | G06F 3/0412 345/173 |
| 2016/0306497 A1* | 10/2016 | Nagai | G06F 3/03545 |
| 2018/0356908 A1* | 12/2018 | Koike | G06F 3/041 |
| 2020/0081577 A1* | 3/2020 | Nomura | G06F 3/038 |

* cited by examiner

| CLASSIFICATION OF ARTICLE | TYPE | THRESHOLD VALUES | |
|---|---|---|---|
| ELECTRONIC PEN | X1 | Th11 | Th21 |
| ELECTRONIC PEN | X2 | Th12 | Th22 |
| ELECTRONIC PEN | X3 | Th13 | Th23 |
| ... | ... | ... | ... |
| TABLET | Y1 | Th14 | Th24 |
| TABLET | Y2 | Th15 | Th25 |
| TABLET | Y3 | Th16 | Th26 |
| ... | ... | ... | ... |

SENSOR CONTROLLER, ELECTRONIC DEVICE, AND POSITION DETECTION METHOD

BACKGROUND

Technical Field

The present disclosure relates to a sensor controller, an electronic device, and a position detection method.

Description of the Related Art

An electronic device has been conventionally known in which a position sensor (hereinafter also referred to as a "touch sensor") for detecting a position indicated by an indicator, such as an electronic pen or a finger, is incorporated. One example of a detection method employed by the touch sensor includes a "capacitive system" in which a position indicated by an indicator is detected from a signal distribution representing changes in the capacitance generated between the indicator and sensor electrodes.

PCT Patent Publication No. WO2018/225204 discloses a position detection method in which a "pen detection process" for detecting a position of an active pen and a "touch detection process" for detecting a position of a passive pointer are performed in a time-division manner.

This type of touch sensor includes a plurality of sensor electrodes forming a sensor region and a routed trace group that is a collection of traces routed along an outer edge of the sensor region from ends of the plurality of sensor electrodes. Hereinafter, a frame-shaped region in which this routed trace group is disposed will also be referred to as a "bezel portion."

Although an active pen is normally detected only within the sensor region, there are some cases where an unexpected detection occurs outside the sensor region. For example, when the active pen is located in the vicinity of the bezel portion, a signal transmitted from the active pen may be, in some cases, received via the routed trace group, thereby causing a detection signal to be mixed in without going through the sensor region. As a result, a random position within the sensor region is detected as an indicated position even though a user does not intend to indicate this position.

BRIEF SUMMARY

In view of the foregoing, it is desirable to provide a sensor controller, an electronic device, and a position detection method that can suppress the detection of an unexpected pen position when a pen position, which is a position indicated by an active pen, is detected.

A sensor controller according to a first aspect of the present disclosure is connected to a capacitive touch sensor and including a scan execution circuit which, in operation, repeatedly performs a first scan and a second scan on the touch sensor in a time-division manner, the first scan detecting an active pen that transmits a signal, the second scan detecting a passive pointer that does not transmit the signal, a first calculation circuit which, in operation, calculates a first pen position from a first detection signal acquired through the first scan performed by the scan execution circuit, the first pen position being a position indicated by the active pen, a second calculation circuit which, in operation, calculates a touch position and a second pen position from a second detection signal acquired through the second scan performed by the scan execution circuit, the touch position being a position indicated by the passive pointer, the second pen position being a position indicated by the active pen, and an output processing circuit which, in operation, outputs a pen position that differs depending on a result of a comparison process in which the first pen position calculated by the first calculation circuit is compared with the second pen position calculated by the second calculation circuit.

An electronic device according to a second aspect of the present disclosure includes a capacitive touch sensor, and a sensor controller connected to the capacitive touch sensor, in which the sensor controller includes a scan execution circuit which, in operation, repeatedly performs a first scan and a second scan on the touch sensor in a time-division manner, the first scan detecting an active pen that transmits a signal, the second scan detecting a passive pointer that does not transmit the signal, a first calculation circuit which, in operation, calculates a first pen position from a first detection signal acquired through the first scan performed by the scan execution circuit, the first pen position being a position indicated by the active pen, a second calculation circuit which, in operation, calculates a touch position and a second pen position from a second detection signal acquired through the second scan performed by the scan execution circuit, the touch position being a position indicated by the passive pointer, the second pen position being a position indicated by the active pen, and an output processing circuit which, in operation, outputs a pen position that differs depending on a result of a comparison process in which the first pen position calculated by the first calculation circuit is compared with the second pen position calculated by the second calculation circuit.

A position detection method according to a third aspect of the present disclosure is a method performed by a sensor controller that is coupled to a capacitive touch sensor and including by a sensor controller, repeatedly performing a first scan and a second scan on the capacitive touch sensor in a time-division manner, the first scan detecting an active pen that transmits a signal, the second scan detecting a passive pointer that does not transmit the signal, calculating a first pen position from a first detection signal acquired through the first scan, the first pen position being a position indicated by the active pen, calculating a touch position and a second pen position from a second detection signal acquired through the second scan, the touch position being a position indicated by the passive pointer, the second pen position being a position indicated by the active pen, and outputting a pen position that differs depending on a result of a comparison process in which the first pen position is compared with the second pen position.

According to an embodiment of the present disclosure, the detection of an unexpected pen position can be suppressed when a pen position, which is a position indicated by an active pen, is detected.

DETAILED DESCRIPTION

An embodiment of the present disclosure will be described below with reference to the accompanying drawings. The same constituent components will be denoted with the same reference signs in each drawing as much as possible to facilitate understanding of the description, and redundant description will be omitted.

Configuration of Input System 10
Overall Configuration

Figure 1:
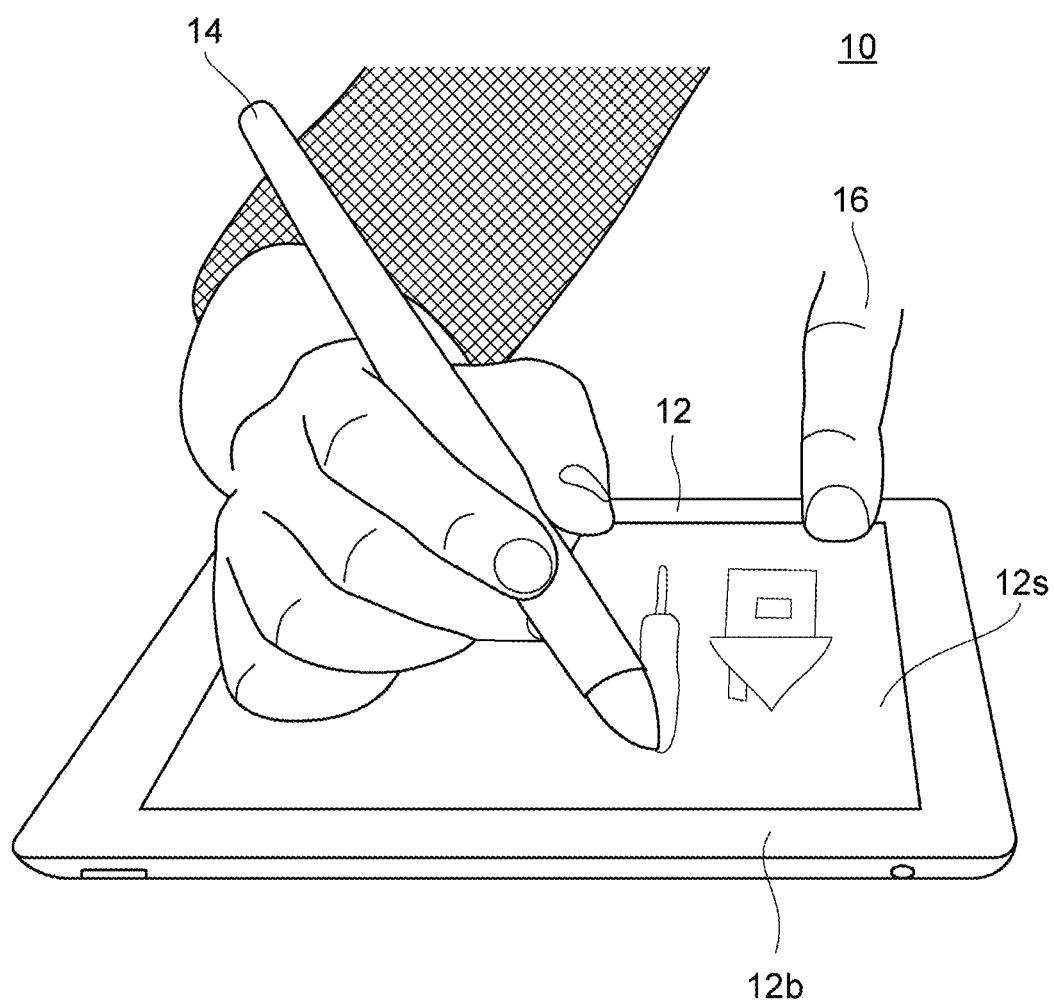
FIG. 1 is a view depicting an overall configuration of an input system in which a tablet terminal, which is an electronic device according to an embodiment of the present disclosure, is incorporated.

FIG. 1 is a view depicting an overall configuration of an input system 10 in which a tablet terminal 12, which is an electronic device according to an embodiment of the present disclosure, is incorporated. The input system 10 basically includes the tablet terminal 12 (equivalent to an "electronic device") and an electronic pen 14 (equivalent to an "active pen").

The tablet terminal 12 is an electronic device including a touch panel display. The electronic device may be a tablet device, a smartphone, a personal computer, or a wearable terminal. A touch surface 12s, which accepts an input operation by a user, and a bezel portion 12b, which surrounds an outer edge of the touch surface 12s, are disposed on a front surface of the tablet terminal 12.

The user can draw pictures and characters on the tablet terminal 12 by holding the electronic pen 14 with one hand and moving it while pressing a pen tip of the electronic pen 14 against the touch surface 12s of the tablet terminal 12. By bringing a finger 16 (equivalent to a "passive pointer") of the user into contact with the touch surface 12s, the user can also perform desired operations via user control being displayed.

The electronic pen 14 is a pen-type pointing device that operates using an active capacitive coupling active capacitance system (AES). The electronic pen 14 can communicate with the tablet terminal 12 at least through capacitive coupling communication. Hereinafter, a signal transmitted from the tablet terminal 12 to the electronic pen 14 will be referred to as an "uplink signal" and a signal transmitted from the electronic pen 14 to the tablet terminal 12 will be referred to as a "downlink signal."

Apparatus Configuration of Tablet Terminal 12

Figure 2:
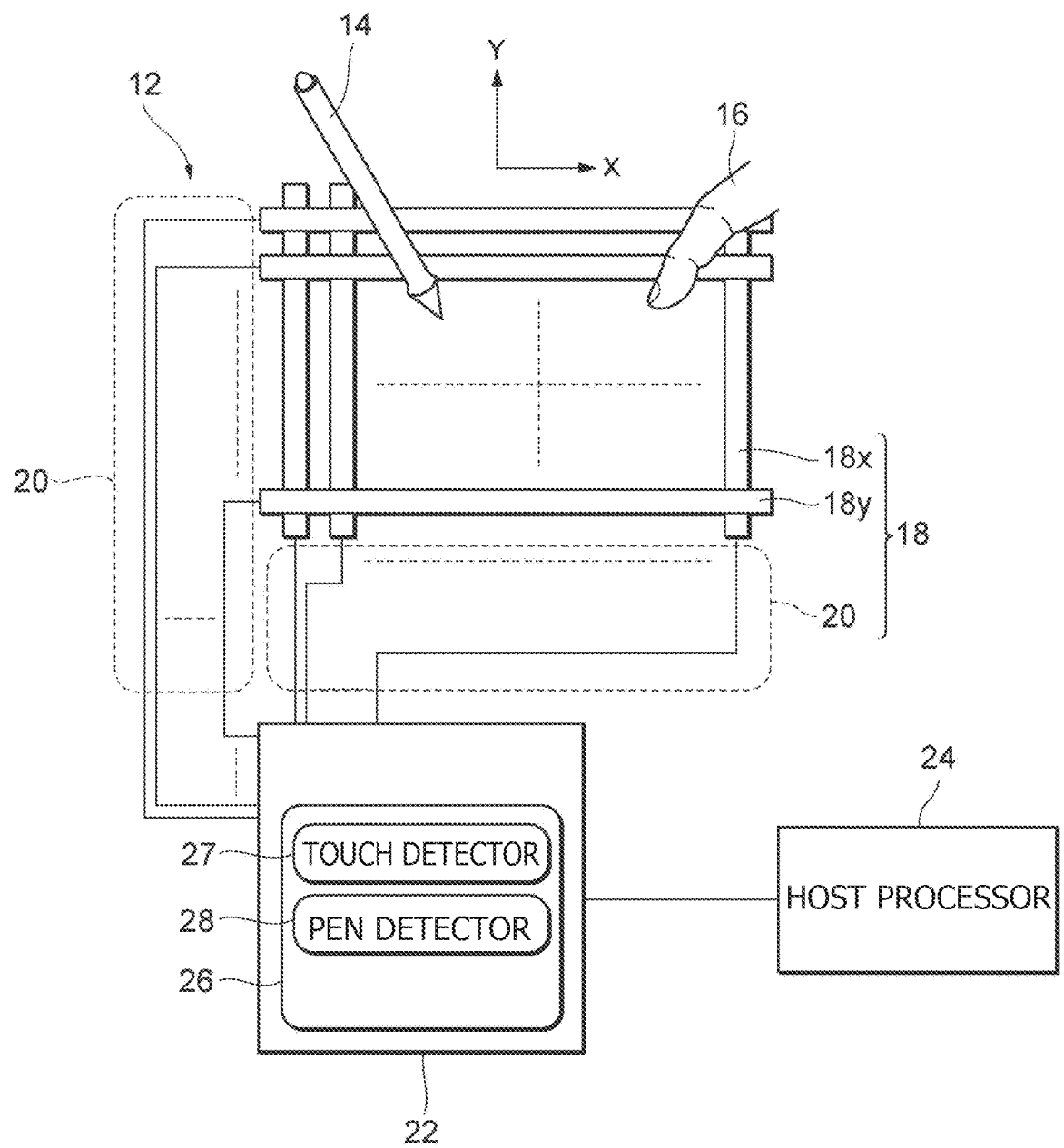
FIG. 2 is a diagram depicting an apparatus configuration of the tablet terminal of FIG. 1.

FIG. 2 is a diagram depicting an apparatus configuration of the tablet terminal 12 of FIG. 1. The tablet terminal 12 includes a touch sensor 18, a sensor controller 22, and a host processor 24.

The touch sensor 18 is a capacitive position sensor including a plurality of sensor electrodes 18x and 18y, which are arranged in a planar shape. Specifically, the touch sensor 18 includes the plurality of sensor electrodes 18x for detecting a position on an X-axis and the plurality of sensor electrodes 18y for detecting a position on a Y-axis. An X-direction and a Y-direction depicted in FIG. 2 respectively correspond to an X-axis and a Y-axis of a Cartesian coordinate system defined within a sensor region. The sensor electrodes 18x and 18y may include a transparent conductive material including indium tin oxide (ITO) or may include a wire mesh.

The sensor electrodes 18x, which extend in the Y-direction, are arranged at equal intervals along the X-direction. The sensor electrodes 18y, which extend in the X-direction, are arranged at equal intervals along the Y-direction. Instead of the mutual capacitive sensor described above, a self-capacitive sensor in which block-shaped electrodes are arranged in a two-dimensional grid shape may be used as the touch sensor 18. Further, the touch sensor 18 may be a sensor of an "external type" (or an out-cell type) that is attached to a display panel, not depicted, from the outside thereof, or may be a sensor of a "built-in type" (further classified into an on-cell type or an in-cell type) that is integrally configured with the display panel.

The touch sensor 18 further includes a collection of traces (hereinafter also referred to as a "routed trace group 20") routed along the outer edge of the sensor region from ends of the sensor electrodes 18x and 18y, which form the sensor region. The routed trace group 20 is positioned in the bezel portion 12b (FIG. 1) in a planar view and electrically connected to the sensor controller 22.

The sensor controller 22 includes at least one electronic circuit board for driving and controlling the touch sensor 18 and includes a touch IC (hereinafter referred to as a "touch IC 26").

The touch IC 26 is an integrated circuit that is capable of executing firmware and is connected to the touch sensor 18 via the routed trace group 20. The firmware can realize a touch detector 27 and a pen detector 28. The touch detector 27 detects a touch by a passive pointer including the user's finger 16 or a touch pen. The pen detector 28 detects the electronic pen 14, which is an active pointer.

The touch detector 27 has, for example, a function of scanning the touch sensor 18, a function of creating a signal distribution (or a heat map) on the touch sensor 18, and a function of classifying regions on the signal distribution (e.g., classification of the finger 16 and a palm). The pen detector 28 has, for example, a function of scanning the touch sensor 18 (a global scan or a sector scan), a function of receiving and analyzing the downlink signal, a function of estimating a state of the electronic pen 14 (e.g., the position, tilt, and pen pressure), and a function of generating and transmitting the uplink signal including an instruction to the electronic pen 14.

The host processor 24 is an arithmetic processing apparatus including a central processing unit (CPU) or a graphics processing unit (GPU). The host processor 24 reads out and executes a program from a memory, which is not depicted, to perform, for example, a process of generating digital ink using data supplied from the sensor controller 22 and a rendering process for displaying drawing contents indicated by the digital ink.

Functional Blocks

Figure 3:
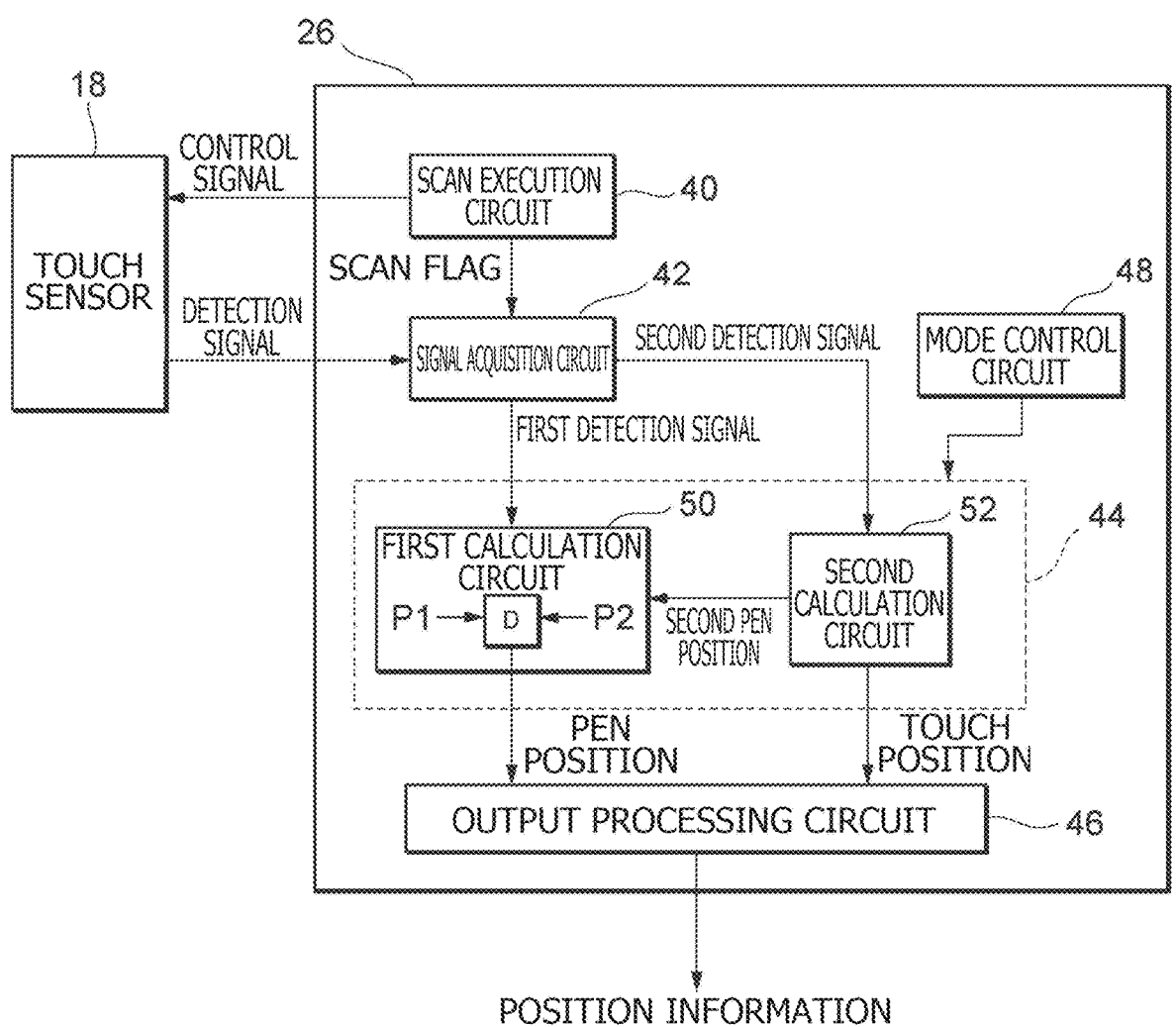
FIG. 3 is a functional block diagram relating to a touch integrated circuit (IC) of FIG. 2.

FIG. 3 is a functional block diagram relating to the touch IC 26 depicted in FIG. 2. The touch IC 26 includes a scan execution circuit 40, a signal acquisition circuit 42, a position calculation circuit 44, an output processing circuit 46, and a mode control circuit 48.

The scan execution circuit 40 repeatedly performs multiple types of scanning processes on the touch sensor 18 in a time-division manner. The multiple types of scanning processes include [1] a "first scan" (or a pen scan) for detecting the electronic pen 14 that transmits the downlink signal and [2] a "second scan" (or a touch scan) for detecting a passive pointer including the finger 16 or a touch pen. The first scan and the second scan may be performed in a ratio of 1:1 or in a ratio of n:m (nm).

The second scan described above is performed to detect changes in capacitance at the sensor electrodes 18x and 18y. The second scan may be, for example, [1] a scan on the basis of the "mutual capacitive system" in which a signal is transmitted from the sensor electrodes 18y and the signal is received by the sensor electrodes 18x to detect changes in mutual capacitance between the sensor electrodes 18x and 18y or [2] a scan on the basis of the "self-capacitive system" in which changes in capacitance at the respective sensor electrodes 18x and 18y are detected.

The signal acquisition circuit 42 acquires detection signals successively output from the touch sensor 18 through the scanning process performed by the scan execution circuit 40. Hereinafter, a detection signal acquired through the first scan will be referred to as a "first detection signal" and a detection signal acquired through the second scan will be referred to as a "second detection signal." A signal value of the first detection signal is defined so as to, for example, increase as a reception level of the downlink signal increases and decrease as the reception level of the downlink signal decreases. A signal value of the second detection signal is defined so as to, for example, increase as the amount of change in capacitance increases and decrease as the amount of change in capacitance decreases.

The position calculation circuit 44 uses the detection signal acquired by the signal acquisition circuit 42, to calculate the position indicated within the sensor region formed by the touch sensor 18. Specifically, the position calculation circuit 44 includes a first calculation circuit 50 and a second calculation circuit 52.

The first calculation circuit 50 calculates a position (hereinafter referred to as a pen position) indicated by an active pen (in the present embodiment, the electronic pen 14) by performing various signal processes on the first detection signal acquired by the signal acquisition circuit 42. The signal processes include [1] a "threshold process" in which the presence or absence of the electronic pen 14 is detected from a magnitude relation between the signal value at each position indicated by the signal distribution and a threshold value or [2] a "position calculation process" in which the pen position is calculated by performing interpolation or approximation arithmetic on the signal distribution.

The first calculation circuit 50 performs a calculation operation that differs depending on a detection mode being performed. When the detection mode is a first mode, the first calculation circuit 50 supplies the pen position calculated by the first calculation circuit 50 itself to the output processing circuit 46 as it is. When the detection mode is a second mode, the first calculation circuit 50 supplies the pen position that differs depending on a result of a comparison process in which a pen position P1 (hereinafter referred to as a "first pen position") calculated by the first calculation circuit 50 itself is compared with a pen position P2 (hereinafter referred to as a "second pen position") calculated by the second calculation circuit 52.

Here, the "comparison process" corresponds to a process for determining the consistency between the first pen position and the second pen position. The "consistency" specifically means that [1] the presence or absence of the position is the same or [2] the distance between the first and second pen positions is within an acceptable range. An example of the "acceptable range" includes the number of pitches n of the sensor electrodes 18x and 18y (n is a natural number; e.g., n=1).

An example of the "pen position that differs" includes [1] the first pen position, [2] the second pen position, [3] a combined position of the first and second pen positions, [4] a pen position corresponding to "validation" of the first pen position, or [5] a pen position corresponding to "invalidation" of the first pen position. "Validation of the first pen position" means that the first pen position tentatively determined by the first calculation circuit 50 is determined as "valid." A data process for the validation includes outputting the first pen position or outputting a valid flag together with the first pen position. "Invalidation of the first pen position" means that the first pen position tentatively determined by the first calculation circuit 50 is determined as "invalid." A data process for the invalidation includes not outputting the first pen position or outputting an invalid flag together with the first pen position. For example, the first calculation circuit 50 may validate the first pen position when the first pen position matches the second pen position within the acceptable range, while invalidating the first pen position when the first pen position does not match the second pen position within the acceptable range.

The second calculation circuit 52 calculates a position (hereinafter referred to as a touch position) indicated by a passive pointer (in the present embodiment, the finger 16) by performing various signal processes on the second detection signal acquired by the signal acquisition circuit 42. The signal processes include [1] a "threshold process" in which the presence or absence of the finger 16 is detected from a magnitude relation between the signal value at each position indicated by the signal distribution and a threshold value, [2] an "identification process" in which the type of touch (e.g., the finger 16, the palm, the electronic pen 14, or another object) is identified on the basis of the size or shape of a region detected by the threshold process, or [3] a "position calculation process" in which the touch position is calculated by performing interpolation or approximation arithmetic on the signal distribution.

The second calculation circuit 52 performs a calculation operation that differs depending on the detection mode being performed. When the detection mode is the first mode, the second calculation circuit 52 calculates only the touch position from the second detection signal and supplies the touch position to the output processing circuit 46. When the detection mode is the second mode, the second calculation circuit 52 calculates the touch position from the second detection signal and supplies the touch position to the output processing circuit 46, and also calculates the pen position (that is, the second pen position) of the electronic pen 14 from the second detection signal and supplies the pen position to the first calculation circuit 50.

For example, the second calculation circuit 52 performs a threshold process of extracting a position where the signal value within the signal distribution indicated by the second detection signal exceeds a first threshold value (hereinafter referred to as a first threshold process) and calculates the touch position on the basis of the position extracted through the first threshold process. For example, the second calculation circuit 52 performs a threshold process of extracting a position where the signal value within the signal distribution indicated by the second detection signal exceeds a second threshold value smaller than the first threshold value and does not exceed the first threshold value (hereinafter referred to as a second threshold process) and calculates the second pen position on the basis of the position extracted through the second threshold process.

The first threshold value and the second threshold value may be fixed values or variable values. In the case of variable values, at least one of the first threshold value and the second threshold value may be set so as to vary depending on the type of the electronic pen 14 or the type of the touch sensor 18. The "type" includes, for example, the manufacturer name, product name, model name, standard name, and specifications.

The output processing circuit 46 generates position information including the pen position or touch position calculated by the position calculation circuit 44 and then outputs data indicating the position information to the host processor 24 (FIG. 2). The output processing circuit 46 may output the data at a predetermined cycle (e.g., 100 Hz).

As with the position calculation circuit 44, the output processing circuit 46 performs an output operation that differs depending on the detection mode being performed. When the detection mode is the first mode, the output processing circuit 46 generates position information including the pen position calculated by the first calculation circuit 50 itself and outputs data indicating the position information to the host processor 24. When the detection mode is the second mode, the output processing circuit 46 generates position information including the pen position that differs depending on a result of the comparison process in which the first pen position is compared with the second pen position and outputs data indicating the position information to the host processor 24. For example, the output processing circuit 46 outputs data for validating the first pen position when the first pen position matches the second pen position within the acceptable range and outputs data for invalidating the first pen position when the first pen position does not match the second pen position within the acceptable range.

The mode control circuit 48 switches a plurality of detection modes, for example, switches one of the first mode and the second mode that are the detection modes. The "first mode" corresponds to a detection mode in which the pen position is output without the comparison process described above. The second mode corresponds to a detection mode in which the comparison process described above is performed and the pen position is output. While the second mode is being performed, the comparison process may be performed at all times or the comparison process may be performed spasmodically or intermittently. For example, the comparison process may be temporarily omitted when [1] the first calculation circuit 50 has been unable to calculate the first pen position or [2] the second calculation circuit 52 has been unable to calculate the second pen position.

The mode control circuit 48 determines when to start or end the second mode on the basis of information regarding switching of the detection mode (hereinafter referred to as "mode information"). The mode information includes, for example, [1] "operation information" indicating an operation state of the tablet terminal 12 or the electronic pen 14 or [2] "reception information" indicating a reception state of the downlink signal. An example of the operation information includes, for example, a pen pressure value of the electronic pen 14 or an operation flag from the tablet terminal 12 or the electronic pen 14. An example of the reception information includes the number of times the downlink signal has been received since a reference point in time.

For example, the mode control circuit 48 may start the second mode in response to the detection of a pen-down operation using the electronic pen 14. The mode control circuit 48 may also end the second mode when a predetermined time has elapsed since the start of the second mode or when a signal has been received a predetermined number of times from the electronic pen 14 since the start of the second mode.

Operation of Input System 10

The input system 10 in which the tablet terminal 12, which is the electronic device according to the present embodiment, is incorporated is configured as described above. An operation of detecting the position indicated by the tablet terminal 12 will be described below with reference to FIGS. 4 to 15.

Overall Operation

The detection operation performed by the touch IC 26 of the tablet terminal 12 will now be described with reference to a flowchart of FIG. 4.

Figure 4:
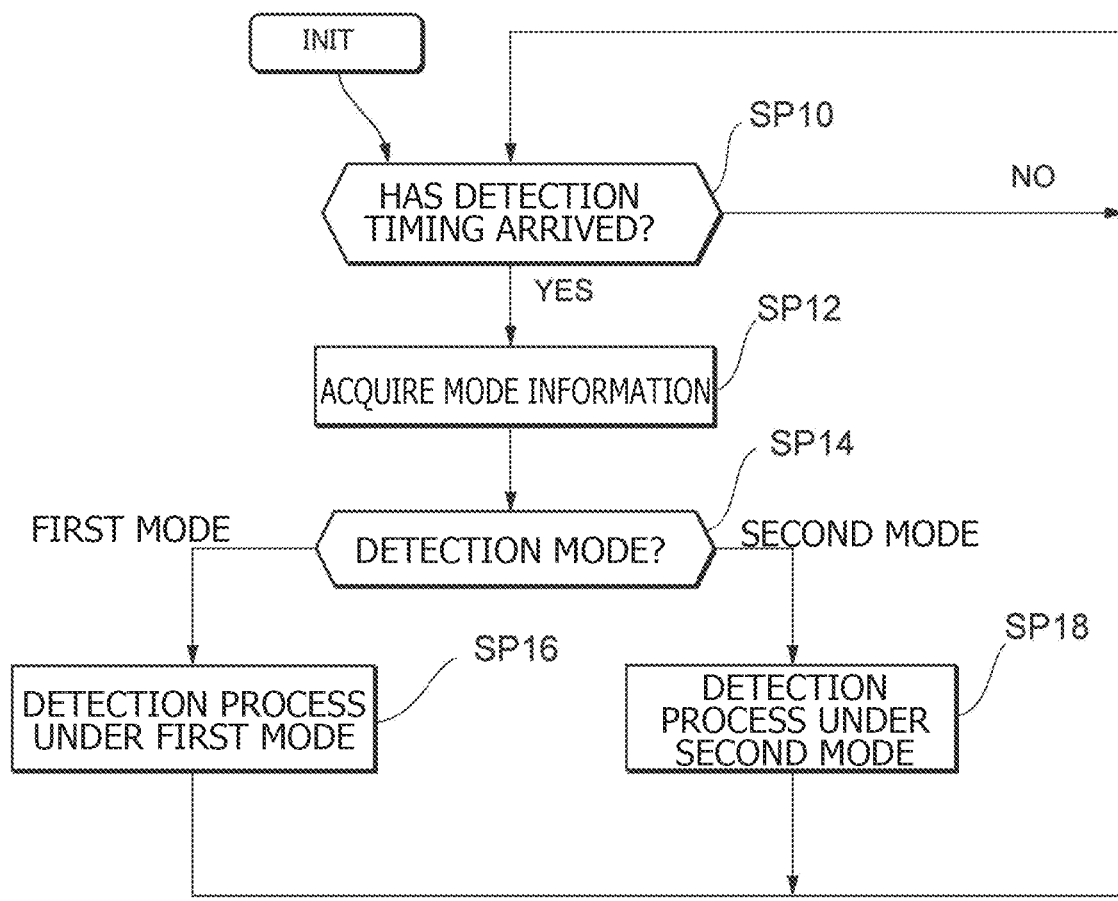
FIG. 4 is a flowchart relating to a detection operation performed by the touch IC of FIG. 3.

At SP10 of FIG. 4, the touch IC 26 checks whether or not a detection timing has arrived. When the detection timing has not arrived yet (SP10: NO), the touch IC 26 stays at SP10 until the detection timing arrives. On the other hand, when the detection timing has arrived (SP10: YES), the touch IC 26 proceeds to the next SP12.

At SP12, the mode control circuit 48 acquires mode information (e.g., the most recent pen pressure value of the electronic pen 14) to select the detection mode.

At SP14, the mode control circuit 48 selects one of the detection modes including the first mode and the second mode on the basis of the mode information acquired at SP12. When the mode control circuit 48 selects the first mode (SP14: first mode), the mode control circuit 48 supplies a mode flag indicating the first mode to the position calculation circuit 44 and proceeds to SP16.

At SP16, the position calculation circuit 44 performs a detection process under the first mode selected at SP14. After that, the touch IC 26 returns to SP10 and repeatedly performs SP10, SP12, SP14, and SP16 while the first mode is continuously selected.

Returning to SP14, when the mode control circuit 48 selects the second mode (SP14: second mode), the mode control circuit 48 supplies a mode flag indicating the second mode to the position calculation circuit 44 and proceeds to SP18.

At SP18, the position calculation circuit 44 performs a detection process under the second mode selected at SP14. After that, the touch IC 26 returns to SP10 and repeatedly performs SP10, SP12, SP14, and SP18 while the second mode is continuously selected.

In this way, the touch IC 26 performs the operation for detecting the indicated position in real time by repeatedly performing SP10 to SP18.

Figure 5:
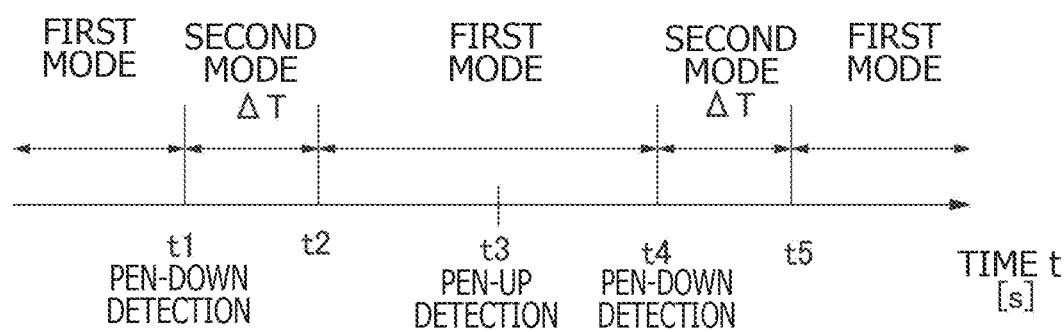
FIG. 5 is a diagram depicting an example of a result of switching detection modes.

FIG. 5 is a diagram depicting an example of a result of switching the detection modes. An axis extending in a horizontal direction represents the passage of time t (unit: s). For example, assume the case where the detection mode is switched from the first mode to the second mode in response to the detection of the pen-down operation and the detection mode is switched from the second mode to the first mode in response to the passage of a predetermined duration time (ΔT) since the detection of the pen-down operation.

At t<t1, when the electronic pen 14 is hovering, the first mode is performed. After that, at t=t1, the detection mode is switched from the first mode to the second mode in response to the detection of the pen-down operation of the electronic pen 14 for the first time. After that, at t=t2, the detection mode is switched from the second mode to the first mode in response to the elapse of the duration time ΔT.

Subsequently, after a pen-move operation of the electronic pen 14 is performed (t2<t<t3) and then a pen-up operation is performed (t3≤ t<t4), the first mode continues to be performed. After that, at t=t4, the detection mode is switched from the first mode to the second mode in response to the detection of the pen-down operation of the electronic pen 14 for the second time. After that, at t=t5, the detection mode is switched from the second mode to the first mode in response to the elapse of the duration time ΔT.

Description of First Mode

The first mode (SP16) of FIG. 4 will be described in detail below with reference to a flowchart of FIG. 6.

Figure 6:
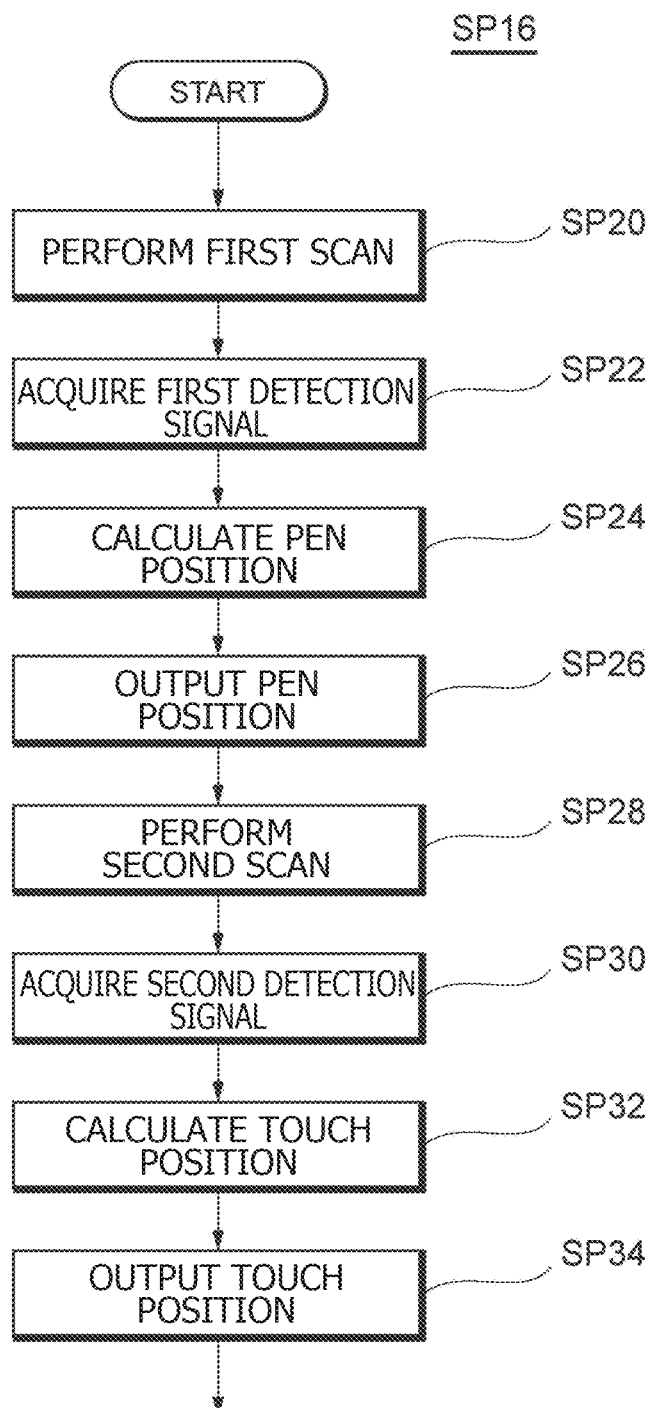
FIG. 6 is a detailed flowchart relating to a first mode (SP16) of FIG. 4.

At SP20 of FIG. 6, the scan execution circuit 40 performs the first scan on the touch sensor 18.

At SP22, the signal acquisition circuit 42 acquires the first detection signal corresponding to the first scan performed at SP20.

At SP24, the position calculation circuit 44 (more particularly, the first calculation circuit 50) calculates the pen position from the first detection signal acquired at SP22.

At SP26, the output processing circuit 46 generates position information including the pen position calculated at SP24 and supplies data indicating the position information to the host processor 24.

At SP28, the scan execution circuit 40 performs the second scan on the touch sensor 18.

At SP30, the signal acquisition circuit 42 acquires the second detection signal corresponding to the second scan performed at SP26.

At SP32, the position calculation circuit 44 (more particularly, the second calculation circuit 52) calculates the touch position from the second detection signal acquired at SP42.

At SP34, the output processing circuit 46 generates position information including the touch position calculated at SP32 and supplies data indicating the position information to the host processor 24.

In this way, the touch IC 26 ends the detection process under the first mode (SP16 of FIG. 4). As can be understood from FIG. 6, in this detection process, the detection of the pen position and the detection of the touch position are performed independently from each other.

Normally, the electronic pen 14 is detected only within the touch surface 12s (or the sensor region). In some cases, however, the electronic pen 14 may be unexpectedly detected outside the touch surface 12s. For example, when the electronic pen 14 is located in the vicinity of the bezel portion 12b, there is a possibility that a signal transmitted from the electronic pen 14 (i.e., the downlink signal) is received via the routed trace group 20, so that the detection signal is mixed in without going through the touch surface 12s. As a result, there is a possibility that a ghost (or an afterimage) is displayed on the tablet terminal 12.

Figure 7:
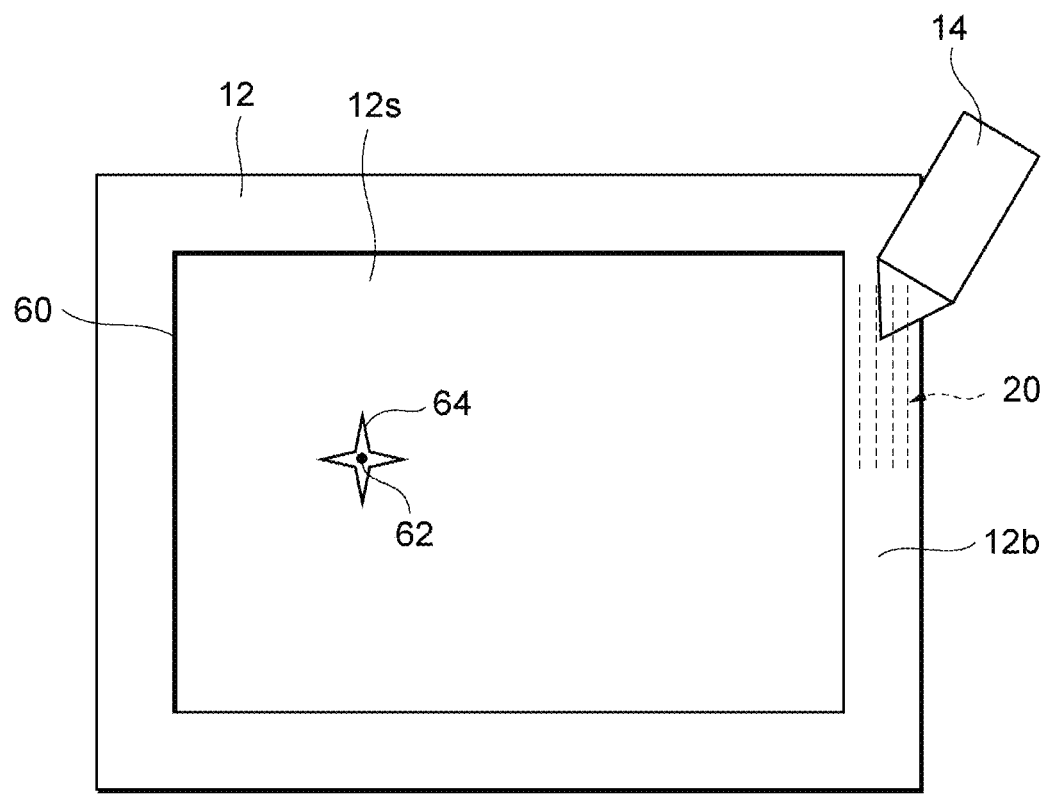
FIG. 7 is a view depicting an example of a result of performing the first mode under circumstances where ghosting may occur.

FIG. 7 is a view depicting an example of a result of performing the first mode under circumstances where ghosting may occur. It is assumed that the user performs an operation of causing the pen tip of the electronic pen 14 to touch the bezel portion 12b. In this case, since a false detection point 62 is not excluded from the pen position through the first mode, there is a possibility that a pointer 64 indicating the false detection point 62 is displayed within a display region 60 even though the user does not intend to indicate this point. In particular, when the routed trace group 20 is thin and highly dense, a detection signal is more likely to mix in via the bezel portion 12b.

Description of Second Mode

The detection operation under the second mode (SP18 of FIG. 4) will be described in detail below with reference to a flowchart of FIG. 8 and FIGS. 9 to 13. The "second mode" is performed in order to suppress the occurrence of ghosting described above.

Figure 8:
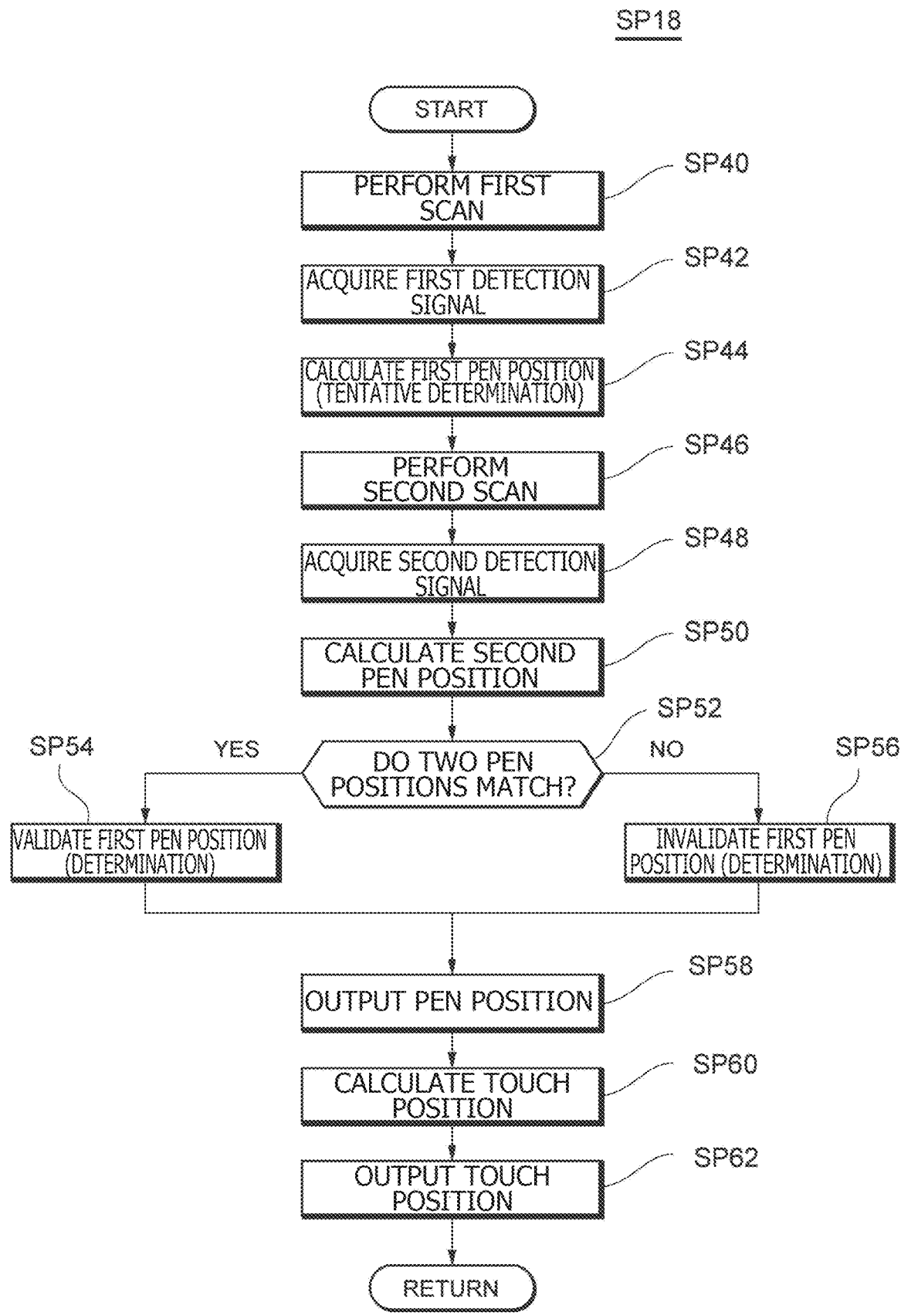
FIG. 8 is a detailed flowchart relating to a second mode (SP18) of FIG. 4.

At SP40 of FIG. 8, the scan execution circuit 40 performs the first scan on the touch sensor 18. This scanning process is performed in a similar way to SP20 (FIG. 6).

At SP42, the signal acquisition circuit 42 acquires the first detection signal corresponding to the first scan performed at SP40. This acquisition process is performed in a similar way to SP22 (FIG. 6).

At SP44, the position calculation circuit 44 (more particularly, the first calculation circuit 50) calculates the first pen position from the first detection signal acquired at SP42 to tentatively determine the pen position. This calculation process is performed in a similar way to SP24 (FIG. 6).

Figure 9:
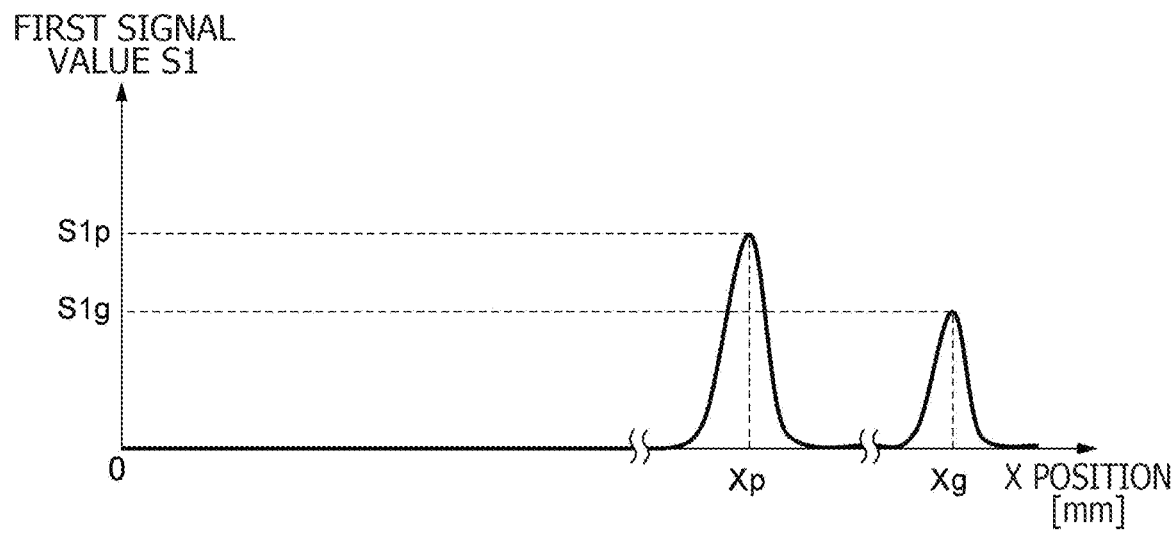
FIG. 9 is a diagram schematically depicting a shape of a signal distribution represented by a first detection signal.

FIG. 9 is a diagram schematically depicting a shape of the signal distribution represented by the first detection signal. The signal distribution exemplified in FIG. 9 has [1] a first peak portion resulting from the reception from the sensor electrodes 18x and 18y and [2] a second peak portion resulting from the reception from the routed trace group 20. The first peak portion has a shape having a position Xp as the apex with the maximum of a first signal value S1 being Slp. The second peak portion has a shape having a position Xg as the apex with the maximum of the first signal value S1 being Slg. For convenience of description, two types of peak portions (first and second peak portions) are depicted simultaneously. However, when there is only one electronic pen 14, one of these types of peak portions is generated in normal cases.

At SP46, the scan execution circuit 40 performs the second scan on the touch sensor 18. This scanning process is performed in a similar way to SP28 (FIG. 6).

At SP48, the signal acquisition circuit 42 acquires the second detection signal corresponding to the second scan performed at SP46. This acquisition process is performed in a similar way to SP30 (FIG. 6).

Figure 10:
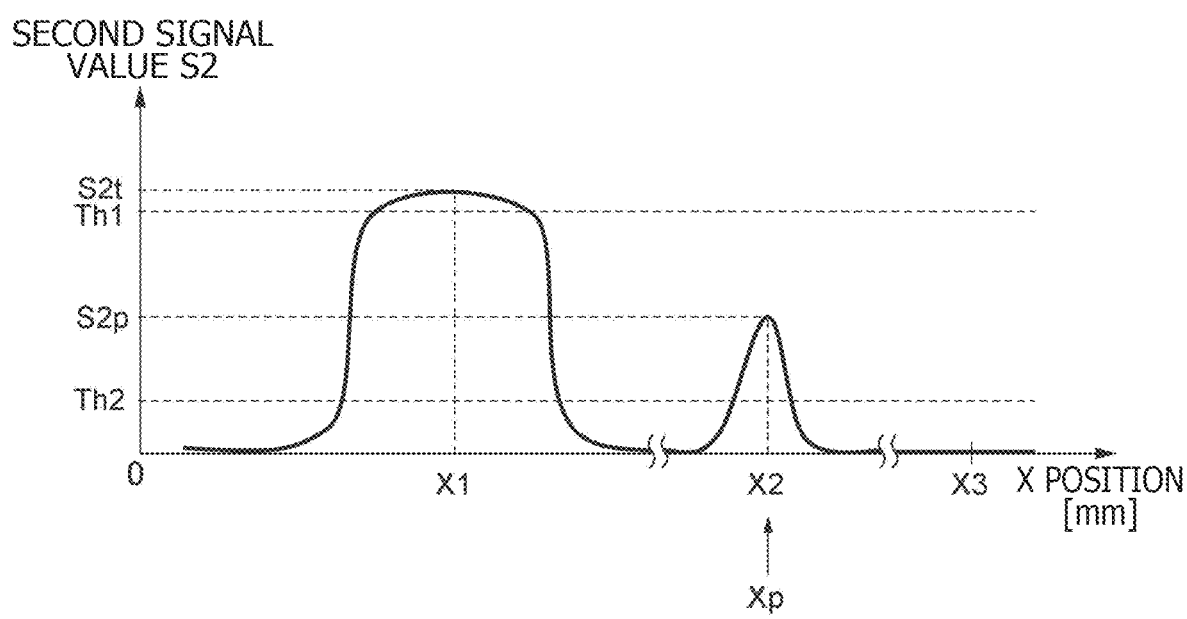
FIG. 10 is a diagram depicting a first example of a signal distribution represented by a second detection signal.

FIG. 10 is a diagram depicting a first example of the signal distribution represented by the second detection signal. The signal distribution in the first example is acquired when both the finger 16 and the electronic pen 14 are on the touch surface 12s. This signal distribution has [1] a third peak portion resulting from a touch by the finger 16 and [2] a fourth peak portion resulting from a touch by the electronic pen 14. The third peak portion has a shape having a position X1 as the apex with the maximum of a second signal value S2 being S2t. The fourth peak portion has a shape having a position X2 as the apex with the maximum of the second signal value S2 being S2p.

Figures 11, 12:
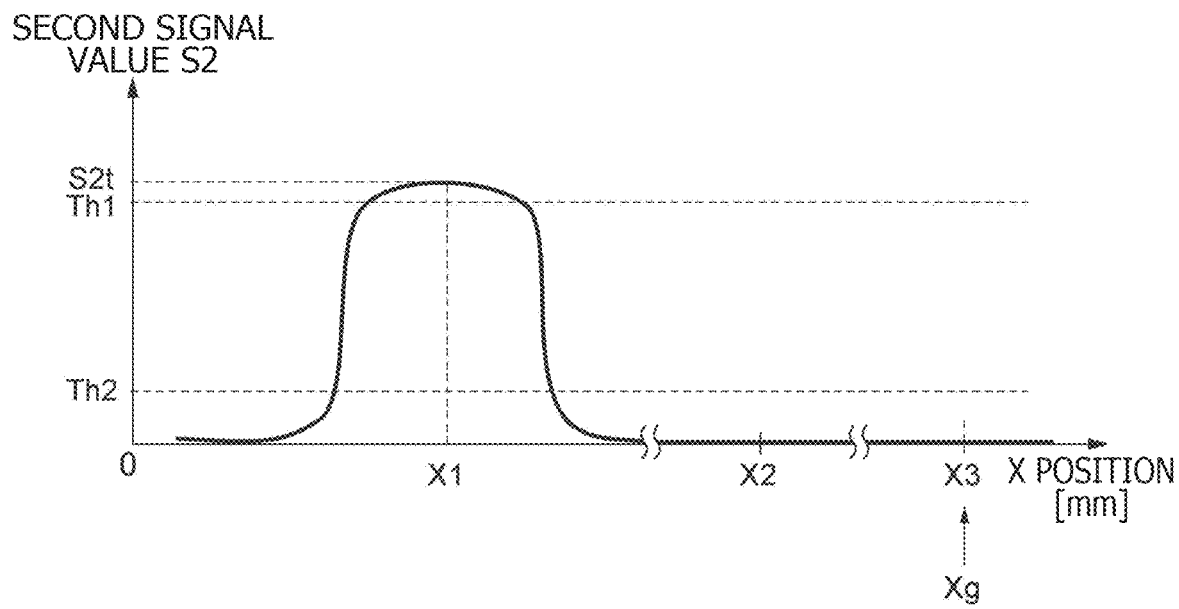
FIG. 11 is a diagram depicting a second example of the signal distribution represented by the second detection signal.
FIG. 12 is a diagram depicting an example of a rule for setting threshold values.

FIG. 11 is a diagram depicting a second example of the signal distribution represented by the second detection signal. The signal distribution in the second example is acquired when the finger 16 is on the touch surface 12s and the electronic pen 14 is in the vicinity of the bezel portion 12b. This signal distribution has a third peak portion resulting from a touch by the finger 16 but does not have a fourth peak portion corresponding to the position (X3=Xg) where ghosting occurs in FIG. 9.

At SP50 of FIG. 8, the position calculation circuit 44 (more particularly, the second calculation circuit 52) calculates the second pen position from the second detection signal acquired at SP48.

In the first example of FIG. 10, a first threshold value Th and a second threshold value Th2 are set so as to satisfy a magnitude relation of 0<Th2<S2$p$<Th1<S2$t$. In this case, X2 is calculated as the second pen position through the threshold process. However, in the second example of FIG. 11, no second pen position is calculated through the threshold process.

FIG. 12 is a diagram depicting an example of a rule for setting the threshold values. More particularly, FIG. 12 depicts a table indicating a correspondence relation among the classification of the article, the type, and the threshold values. The "classification of the article" includes the apparatus name (e.g., an electronic pen or a tablet) or the component name (e.g., a touch sensor). The "type" includes, for example, the manufacturer name, the product name, the model name, the standard name, and the specifications. For example, a first threshold value Th11 and a second threshold value Th21 are set as the threshold values suitable for "an electronic pen of a type X1." By determining the threshold values according to the setting rule, it is possible to perform detection taking into account the fact that the levels or shapes of signals that can be mixed in from the routed trace group 20 vary depending on the type of the electronic pen 14 or the type of the touch sensor 18.

At SP52 of FIG. 8, the position calculation circuit 44 (more particularly, the first calculation circuit 50) determines whether or not the first pen position calculated at SP44 matches the second pen position calculated at SP50. In the example of FIG. 10, since the first pen position Xp matches the second pen position X2 (SP52: YES), the position calculation circuit 44 proceeds to SP54.

At SP54, the position calculation circuit 44 (more particularly, the first calculation circuit 50) validates the first pen position calculated at SP44 and determines the pen position. Specifically, the first calculation circuit 50 supplies the first pen position to the output processing circuit 46 as the detected pen position.

Returning to SP52, in the example of FIG. 11, since there is no second pen position that matches the first pen position Xg (i.e., the position where ghosting occurs) (SP52: NO), the position calculation circuit 44 proceeds to SP56.

At SP56, the position calculation circuit 44 (more particularly, the first calculation circuit 50) invalidates the first pen position calculated at SP44 and determines the pen position. Specifically, the first calculation circuit 50 supplies information indicating that no pen position has been detected to the output processing circuit 46.

At SP58, the output processing circuit 46 generates position information including the pen position supplied at SP54 or SP56 and outputs data indicating the position information to the host processor 24. This output process is performed in a similar way to SP26 (FIG. 6).

At SP60, the position calculation circuit 44 (more particularly, the second calculation circuit 52) calculates the touch position from the second detection signal acquired at SP48. This calculation process is performed in a similar way to SP32 (FIG. 6). In each of the examples of FIGS. 10 and 11, X1 is calculated as the touch position.

At SP62, the output processing circuit 46 generates position information including the touch position calculated at SP60 and outputs data indicating the position information to the host processor 24. This output process is performed in a similar way to SP34 (FIG. 6).

In this way, the touch IC 26 ends the detection process under the second mode (SP18 of FIG. 4). As can be understood from FIG. 8, in this detection process, the detection of the pen position is performed dependently on the detection of the touch position.

Figure 13:
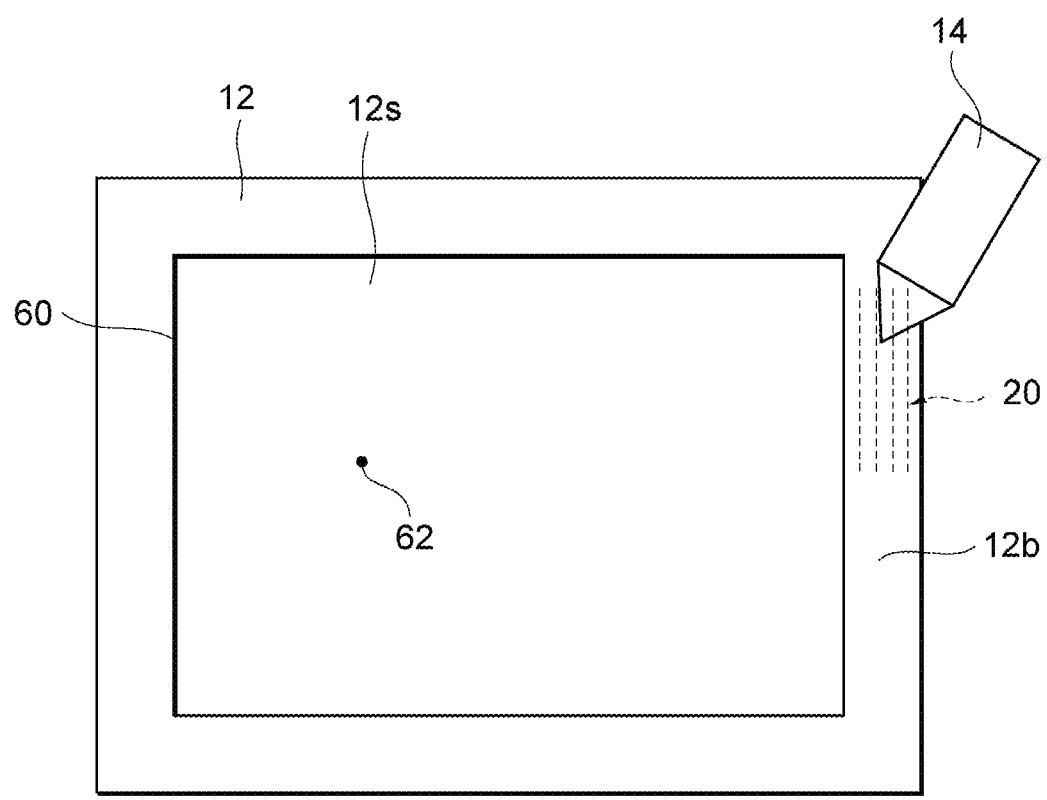
FIG. 13 is a view depicting an example of a result of performing the second mode under circumstances where ghosting may occur.

FIG. 13 is a view depicting an example of a result of performing the second mode under circumstances where ghosting may occur. As in FIG. 7, it is assumed that the user performs an operation of causing the pen tip of the electronic pen 14 to touch the bezel portion 12*b*. In this case, since the false detection point 62 is excluded from the indicated position through the second mode, a pointer is not displayed within the display region 60. In other words, a display result that matches the user's intention can be provided.

Modifications of Second Mode

A first modification (SP18A) of the second mode at SP18 of FIG. 8 will be described in detail below with reference to a flowchart of FIG. 14.

Figure 14:
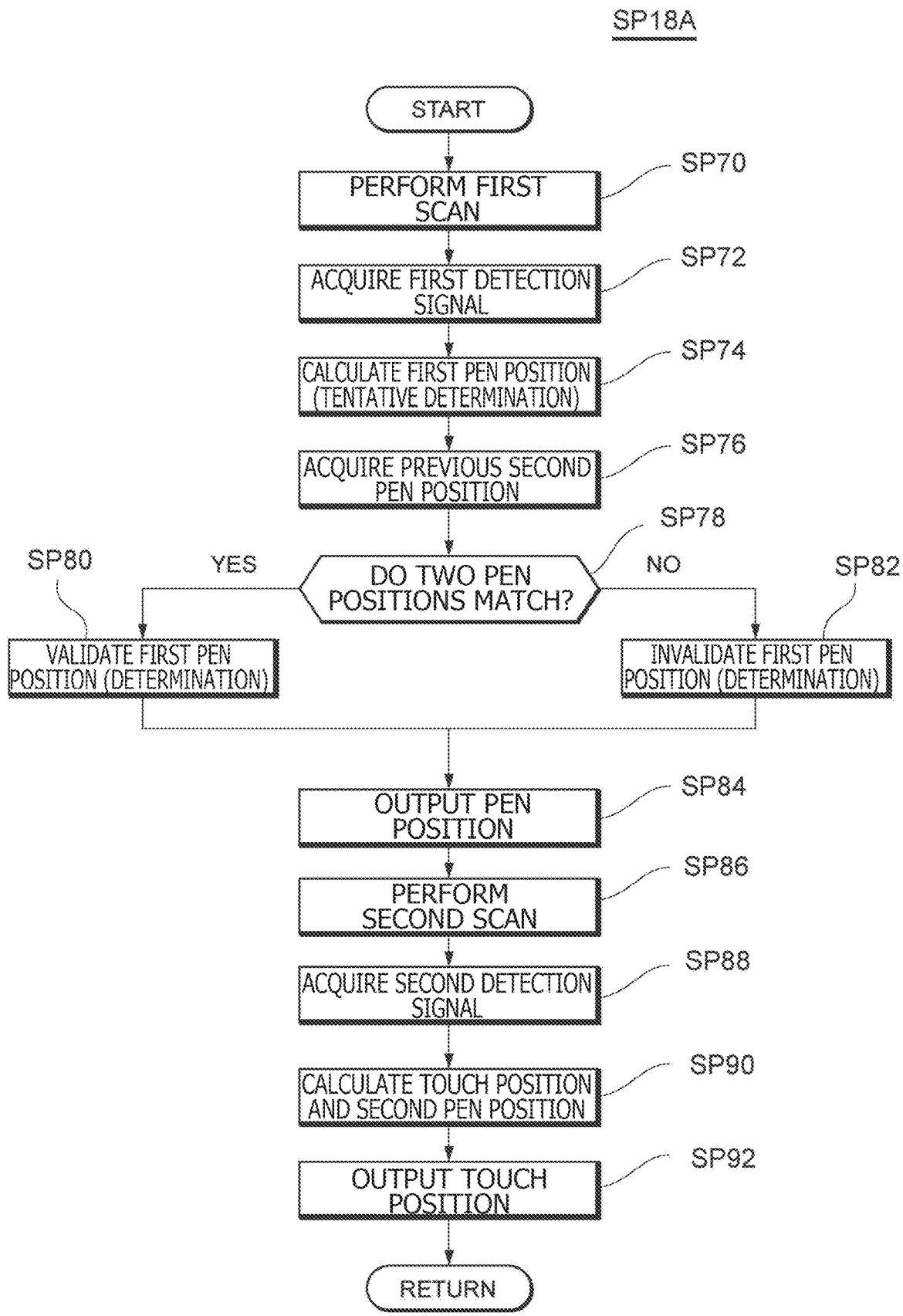
FIG. 14 is a detailed flowchart depicting a first modification of the second mode at SP18 of FIG. 8.

At SP70 of FIG. 14, the scan execution circuit 40 performs the first scan on the touch sensor 18. This scanning process is performed in a similar way to SP40 (FIG. 8).

At SP72, the signal acquisition circuit 42 acquires the first detection signal corresponding to the first scan performed at SP70. This acquisition process is performed in a similar way to SP42 (FIG. 8).

At SP74, the position calculation circuit 44 (more particularly, the first calculation circuit 50) calculates the first pen position from the first detection signal acquired at SP72 and tentatively determines the pen position. This calculation process is performed in a similar way to SP44 (FIG. 8).

At SP76, the position calculation circuit 44 (more particularly, the first calculation circuit 50) acquires the second pen position previously calculated at SP90 to be described later.

At SP78, the position calculation circuit 44 (more particularly, the first calculation circuit 50) determines whether or not the first pen position calculated at SP74 matches the second pen position acquired at SP76. When both positions match with each other (SP78: YES), the position calculation circuit 44 proceeds to SP84.

At SP80, the position calculation circuit 44 (more particularly, the first calculation circuit 50) validates the first pen position calculated at SP74 and determines the pen position. Specifically, the first calculation circuit 50 supplies the first pen position to the output processing circuit 46 as the detected pen position.

Returning to SP78, when the first pen position does not match the second pen position (SP78: NO), the position calculation circuit 44 proceeds to SP82.

At SP82, the position calculation circuit 44 (more particularly, the first calculation circuit 50) invalidates the first pen position calculated at SP74 and determines the pen position. Specifically, the first calculation circuit 50 supplies information indicating that no pen position has been detected to the output processing circuit 46.

At SP84, the output processing circuit 46 generates position information including the pen position supplied at SP80 or SP82 and outputs data indicating the position information to the host processor 24. This output process is performed in a similar way to SP58 (FIG. 8).

At SP86, the scan execution circuit 40 performs the second scan on the touch sensor 18. This scanning process is performed in a similar way to SP46 (FIG. 8).

At SP88, the signal acquisition circuit 42 acquires the second detection signal corresponding to the second scan performed at SP86. This acquisition process is performed in a similar way to SP48 (FIG. 8).

At SP90, the position calculation circuit 44 (more particularly, the second calculation circuit 52) calculates the touch position and the second pen position from the second detection signal acquired at SP88. The process of calculating the touch position is performed in a similar way to SP60 (FIG. 8). The process of calculating the second pen position is performed in a similar way to SP50 (FIG. 8).

At SP92, the output processing circuit 46 generates position information including the touch position calculated at SP90 and outputs data indicating the position information to the host processor 24. This output process is performed in a similar way to SP62 (FIG. 8).

In this way, the touch IC 26 ends the detection process under the second mode (SP18A of FIG. 4). Even if the order of calculation of the first pen position, the second pen position, and the touch position is changed as depicted in FIG. 14, a similar advantageous effect to the advantageous effect obtained with the flowchart of FIG. 8 can be obtained. In particular, it is desirable that the time interval between a point in time of calculation of the first pen position and a point in time of calculation of the second pen position be short, considering that the electronic pen 14 moves.

A second modification of the second mode at SP18 of FIG. 8 (SP18B) will be described in detail below with reference to a flowchart of FIG. 15.

Figure 15:
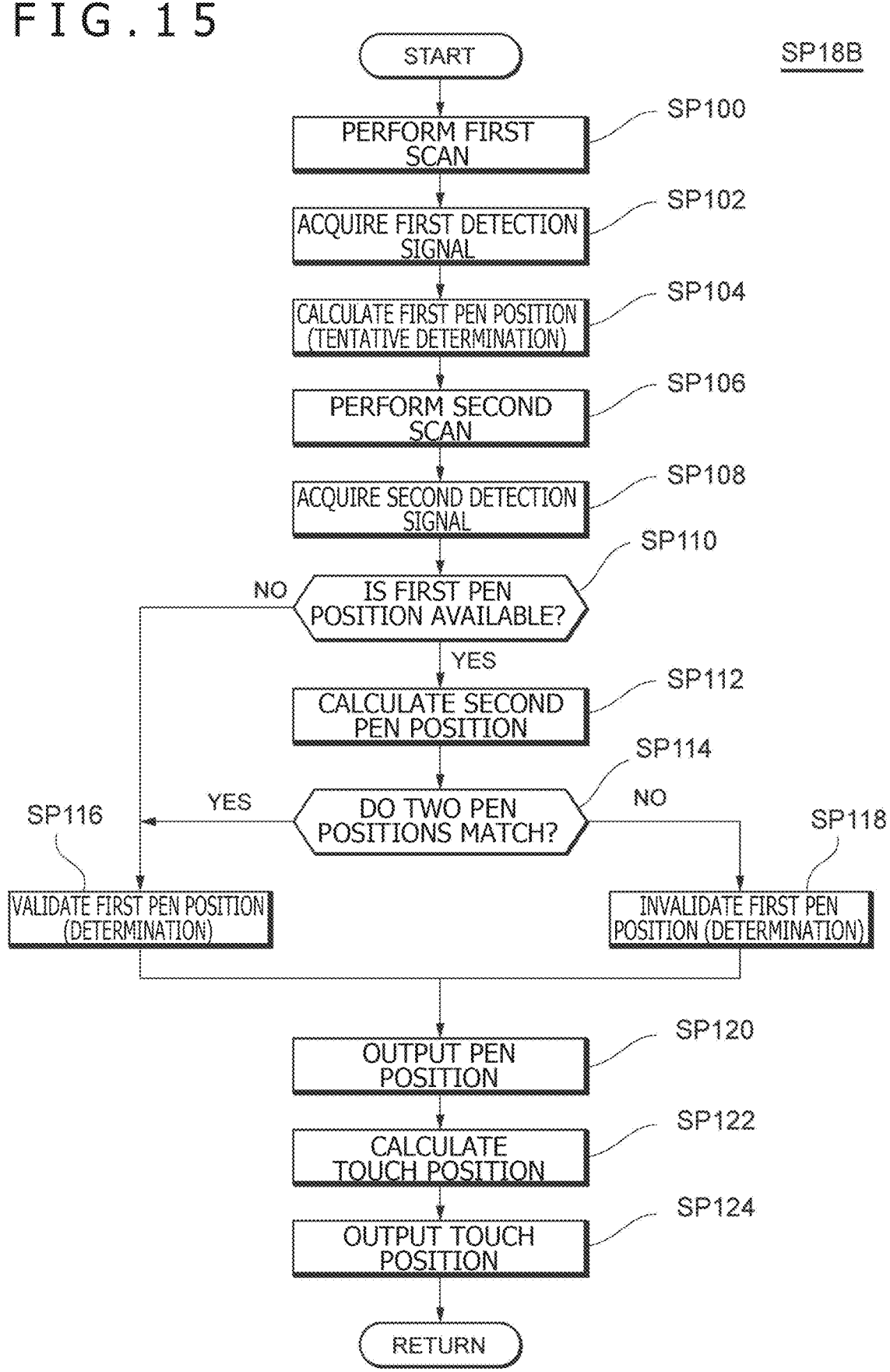
FIG. 15 is a detailed flowchart depicting a second modification of the second mode at SP18 of FIG. 8.

At SP100 of FIG. 15, the scan execution circuit 40 performs the first scan on the touch sensor 18. This scanning process is performed in a similar way to SP40 (FIG. 8).

At SP102, the signal acquisition circuit 42 acquires the first detection signal corresponding to the first scan performed at SP100. This acquisition process is performed in a similar way to SP42 (FIG. 8).

At SP104, the position calculation circuit 44 (more particularly, the first calculation circuit 50) calculates the first pen position from the first detection signal acquired at SP102 and tentatively determines the pen position. This calculation process is performed in a similar way to SP44 (FIG. 8).

At SP106, the scan execution circuit 40 performs the second scan on the touch sensor 18. This scanning process is performed in a similar way to SP46 (FIG. 8).

At SP108, the signal acquisition circuit 42 acquires the second detection signal corresponding to the second scan performed at SP106. This acquisition process is performed in a similar way to SP48 (FIG. 8).

At SP110, the position calculation circuit 44 checks whether or not the first pen position calculated at SP104 is available. When there is no calculated first pen position available (SP110: NO), the position calculation circuit 44 proceeds to SP116 to be described later. On the other hand, when the calculated first pen position is available (SP110: YES), the position calculation circuit 44 proceeds to the next SP112.

At SP112, the position calculation circuit 44 (more particularly, the second calculation circuit 52) calculates the second pen position from the second detection signal acquired at SP108. The process of calculating the second pen position is performed in a similar way to SP50 (FIG. 8).

At SP114, the position calculation circuit 44 (more particularly, the first calculation circuit 50) determines whether or not the first pen position calculated at SP104 matches the second pen position calculated at SP112. When both positions match with each other (SP116: YES), the position calculation circuit 44 proceeds to the next SP116.

At SP116, the position calculation circuit 44 (more particularly, the first calculation circuit 50) validates the first pen position calculated at SP104 and determines the pen position. Specifically, the first calculation circuit 50 supplies the first pen position to the output processing circuit 46 as the detected pen position and proceeds to SP120 to be described later.

Returning to SP114, when the first pen position does not match the second pen position (SP114: NO), the position calculation circuit 44 proceeds to SP118.

At SP118, the position calculation circuit 44 (more particularly, the first calculation circuit 50) invalidates the first pen position calculated at SP104 and determines the pen position. Specifically, the first calculation circuit 50 supplies information indicating that no pen position has been detected to the output processing circuit 46 and proceeds to the next SP120.

At SP120, the output processing circuit 46 generates position information including the pen position supplied at SP116 or SP118 and outputs data indicating the position information to the host processor 24. This output process is performed in a similar way to SP58 (FIG. 8).

At SP122, the position calculation circuit 44 (more particularly, the second calculation circuit 52) calculates the touch position from the second detection signal acquired at SP108. The process of calculating the touch position is performed in a similar way to SP60 (FIG. 8).

At SP124, the output processing circuit 46 generates position information including the touch position calculated at SP122 and outputs data indicating the position information to the host processor 24. This output process is performed in a similar way to SP62 (FIG. 8).

In this way, the touch IC 26 ends the detection process under the second mode (SP18B of FIG. 4). As depicted in FIG. 15, even if whether to perform the comparison process is switched depending on the result of calculation of the first pen position, a similar advantageous effect to the advantageous effect obtained with the flowchart of FIG. 8 can be obtained.

Summary of Embodiment

As described above, the electronic device according to the present embodiment (in the present embodiment, the tablet terminal 12) includes the capacitive touch sensor 18 and the sensor controller 22, which is connected to the touch sensor 18. The sensor controller 22 includes the scan execution circuit 40, the first calculation circuit 50, and the output processing circuit 46. The scan execution circuit 40 repeatedly performs the first scan and the second scan on the touch sensor 18 in a time-division manner. The first scan is performed to detect an active pen (in the present embodiment, the electronic pen 14) that transmits a signal. The second scan is performed to detect a passive pointer (in the present embodiment, the finger 16) that does not transmit the signal. The first calculation circuit 50 calculates the first pen position from the first detection signal acquired through the first scan. The second calculation circuit 52 calculates the touch position and the second pen position from the second detection signal acquired through the second scan. The output processing circuit 46 outputs a pen position that differs depending on a result of a comparison process in which the calculated first pen position is compared with the calculated second pen position.

With a position detection method according to the present embodiment, the sensor controller 22 performs an execution (SP40, SP46) of repeatedly performing the first scan and the second scan on the touch sensor 18 in a time-division manner, a first calculation (SP44) of calculating the first pen position from the first detection signal acquired through the first scan, a second calculation (SP50, SP60) of calculating the touch position and the second pen position from the second detection signal acquired through the second scan, and an output (SP52 to SP58) of outputting the pen position that differs depending on a result of a comparison process in which the first pen position is compared with the second pen position.

In this way, the two pen positions are calculated through two different types of first and second scans and the comparison process in which the two pen positions are compared is performed. This configuration can suppress the detection of an unexpected pen position.

In particular, the touch sensor 18 may include the plurality of sensor electrodes 18x and 18y, which are arranged in a planar shape to form the sensor region, and the routed trace group 20, which is a collection of traces routed along the outer edge of the sensor region from the ends of the plurality of sensor electrodes 18x and 18y. When the electronic pen 14 is located at the outer edge of the sensor region, there is a possibility that the detection signal may be mixed in without going through the sensor region due to the reception of a signal transmitted from the electronic pen 14 via the routed trace group 20. Therefore, the effect of suppressing false detection becomes more pronounced.

The output processing circuit 46 may validate the first pen position when the first pen position matches the second pen position within the acceptable range, and invalidate the first pen position when the first pen position does not match the second pen position within the acceptable range. This configuration can suppress false detection of the electronic pen 14 through the first scan.

The mode control circuit 48 may switch between a plurality of detection modes including the first mode in which the pen position is output without the comparison process and the second mode in which the comparison process is performed and the pen position is output. The detection process can be performed according to the situation by switching between the first mode and the second mode.

The mode control circuit 48 may start the second mode in response to the detection of the pen-down operation using the electronic pen 14. This configuration can suppress false detection that might otherwise occur at the time of the pen-down operation.

The mode control circuit 48 may end the second mode when a predetermined time has elapsed since the start of the second mode or when the signal has been received a predetermined number of times from the electronic pen 14 since the start of the second mode. This configuration can omit the comparison process after the pen-down operation is performed, thereby reducing the arithmetic load by that amount.

The second calculation circuit 52 may perform the first threshold process of extracting a position at which a signal value within the signal distribution indicated by the second detection signal exceeds the first threshold value Th1 and calculate the touch position on the basis of the position extracted through the first threshold process, and perform a second threshold process of extracting a position at which a signal value within the signal distribution indicated by the second detection signal exceeds the second threshold value Th2 (note that Th2<Th1) and does not exceed the first threshold value Th1 and calculate the second pen position on the basis of the position extracted through the second threshold process.

At least one of the first threshold value Th1 and the second threshold value Th2 may be set so as to vary depending on a type of the electronic pen 14 or a type of the touch sensor 18. With this configuration, it is possible to perform detection taking into account the fact that the levels or shapes of signals that can be mixed in from the routed trace group 20 vary depending on the type of the electronic pen 14 or the type of the touch sensor 18.

The comparison process may be performed when the first calculation circuit 50 has been able to calculate the first pen position, and may not be performed when the first calculation circuit 50 has been unable to calculate the first pen position. This configuration can omit an unnecessary comparison process when the first pen position has been unable to be calculated, thereby reducing the arithmetic load by that amount.

The comparison process may be performed when the second calculation circuit 52 has been able to calculate the second pen position, and may not be performed when the second calculation circuit 52 has been unable to calculate the second pen position. This configuration can omit an unnecessary comparison process when the second pen position has been unable to be calculated, thereby reducing the arithmetic load by that amount.

Modifications

The present disclosure is not limited to the embodiment described above and it is a matter of course that any changes can be made to the present disclosure without departing from the scope of the present disclosure. The configurations described in the embodiment may also be combined as desired as long as no technical inconsistency arises. Alternatively, the order of execution of the individual acts of the flowcharts may also be changed as desired as long as no technical inconsistency arises.

In the embodiment described above, the mode control circuit 48 switches between a plurality of detection modes and performs one of the detection modes. However, the selection method is not limited thereto. For example, the touch IC 26 may perform the second mode at all times without performing the first mode.

In the embodiment described above, the first calculation circuit 50 performs the comparison process in which the first pen position is compared with the second pen position. However, the arithmetic method is not limited thereto. For example, the output processing circuit 46 may perform the comparison process described above after acquiring the first and second pen positions from the position calculation circuit 44. Alternatively, another arithmetic circuit may perform the comparison process described above instead of the position calculation circuit 44 or the output processing circuit 46.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A sensor controller connected to a capacitive touch sensor, the sensor controller comprising:
   a scan execution circuit which, in operation, repeatedly performs a first scan and a second scan on the capacitive touch sensor in a time-division manner, the first scan detecting an active pen that transmits a signal, the second scan detecting a passive pointer that does not transmit the signal;
   a first calculation circuit which, in operation, calculates a first pen position from a first detection signal acquired through the first scan performed by the scan execution circuit, the first pen position being a position indicated by the active pen;
   a second calculation circuit which, in operation, calculates a touch position and a second pen position from a second detection signal acquired through the second scan performed by the scan execution circuit, the touch position being a position indicated by the passive pointer, the second pen position being a position indicated by the active pen;
   an output processing circuit which, in operation, outputs a pen position that differs depending on a result of a comparison process in which the first pen position calculated by the first calculation circuit is compared with the second pen position calculated by the second calculation circuit, wherein the output processing circuit, in operation, validates the first pen position when the first pen position matches the second pen position within a particular range, and invalidates the first pen position when the first pen position does not match the second pen position within the particular range; and
   a mode control circuit which, in operation, switches between a plurality of detection modes including a first mode in which the pen position is output without the comparison process and a second mode in which the comparison process is performed and the pen position is output, wherein the mode control circuit, in operation, starts the second mode in response to detection of a pen-down operation using the active pen.

2. The sensor controller according to claim 1, wherein the mode control circuit, in operation, ends the second mode when a predetermined time has elapsed since a start of the second mode or when the signal has been received a predetermined number of times from the active pen since the start of the second mode.

3. The sensor controller according to claim 1, wherein the second calculation circuit, in operation,
   performs a first threshold process of extracting a position at which a signal value within a signal distribution indicated by the second detection signal exceeds a first threshold value and calculates the touch position based on the position extracted through the first threshold process, and
   performs a second threshold process of extracting a position at which a signal value within the signal distribution indicated by the second detection signal exceeds a second threshold value smaller than the first threshold value and does not exceed the first threshold value and calculates the second pen position based on the position extracted through the second threshold process.

4. The sensor controller according to claim 3, wherein at least one of the first threshold value and the second threshold value is set so as to vary depending on a type of the active pen or a type of the capacitive touch sensor.

5. The sensor controller according to claim 1, wherein, in operation, the comparison process is performed when the first calculation circuit has been able to calculate the first pen position, and not performed when the first calculation circuit has been unable to calculate the first pen position.

6. The sensor controller according to claim 1, wherein the comparison process is, in operation, performed when the second calculation circuit has been able to calculate the second pen position, and not performed when the second calculation circuit has been unable to calculate the second pen position.

7. The sensor controller according to claim 1, wherein the capacitive touch sensor includes:
   a plurality of sensor electrodes arranged in a planar shape to form a sensor region, and
   a routed trace group including a plurality of traces routed along an outer edge of the sensor region from ends of the plurality of sensor electrodes.

8. An electronic device comprising:
   a capacitive touch sensor; and
   a sensor controller connected to the capacitive touch sensor,
   wherein the sensor controller includes:
      a scan execution circuit which, in operation, repeatedly performs a first scan and a second scan on the capacitive touch sensor in a time-division manner, the first scan detecting an active pen that transmits a signal, the second scan detecting a passive pointer that does not transmit the signal,
      a first calculation circuit which, in operation, calculates a first pen position from a first detection signal acquired through the first scan performed by the scan execution circuit, the first pen position being a position indicated by the active pen,
      a second calculation circuit which, in operation, calculates a touch position and a second pen position from a second detection signal acquired through the second scan performed by the scan execution circuit, the touch position being a position indicated by the passive pointer, the second pen position being a position indicated by the active pen,
      an output processing circuit which, in operation, outputs a pen position that differs depending on a result of a comparison process in which the first pen position calculated by the first calculation circuit is compared with the second pen position calculated by the second calculation circuit, wherein the output processing circuit, in operation, validates the first pen position when the first pen position matches the second pen position within a particular range, and invalidates the first pen position when the first pen position does not match the second pen position within the particular range, and
      a mode control circuit which, in operation, switches between a plurality of detection modes including a first mode in which the pen position is output without the comparison process and a second mode in which the comparison process is performed and the pen position is output, wherein the mode control circuit, in operation, starts the second mode in response to detection of a pen-down operation using the active pen.

9. A position detection method performed by a sensor controller that is coupled to a capacitive touch sensor, the position detection method comprising:

repeatedly performing a first scan and a second scan on the capacitive touch sensor in a time-division manner, the first scan detecting an active pen that transmits a signal, the second scan detecting a passive pointer that does not transmit the signal;

calculating a first pen position from a first detection signal acquired through the first scan, the first pen position being a position indicated by the active pen;

calculating a touch position and a second pen position from a second detection signal acquired through the second scan, the touch position being a position indicated by the passive pointer, the second pen position being a position indicated by the active pen;

outputting a pen position that differs depending on a result of a comparison process in which the first pen position is compared with the second pen position; and validating the first pen position when the first pen position matches the second pen position within a particular range, and invalidating the first pen position when the first pen position does not match the second pen position within the particular range;

switching between a plurality of detection modes including a first mode in which the pen position is output without the comparison process and a second mode in which the comparison process is performed and the pen position is output; and starting the second mode in response to detection of a pen-down operation using the active pen.

* * * * *